United States Patent
Gomes Da Fonseca et al.

(10) Patent No.: US 12,458,397 B2
(45) Date of Patent: Nov. 4, 2025

(54) METHOD AND DEVICE FOR REGISTRATION AND TRACKING DURING A PERCUTANEOUS PROCEDURE

(71) Applicants: UNIVERSIDADE DO MINHO, Braga (PT); INSTITUTO POLITÉCNICO DO CÁVADO E DO AVE, Barcelos (PT); KARL STORZ SE & Co. KG, Tuttlingen (DE)

(72) Inventors: João Luís Gomes Da Fonseca, Santo Tirso (PT); João Luís Araújo Martins Vilaça, Braga (PT); Sandro Filipe Monteiro Queirós, Braga (PT); Estevão Augusto Rodrigues De Lima, Oporto (PT); Jorge Manuel Nunes Correia Pinto, Oporto (PT)

(73) Assignees: Universidade do Minho, Braga (PT); Instituto Politécnico do Cávado E do Ave, Barcelos (PT); Karl Storz SE & Co. KG, Tuttlingen (DE)

( * ) Notice: Subject to any disclaimer, the term of this patent is extended or adjusted under 35 U.S.C. 154(b) by 61 days.

(21) Appl. No.: 18/288,783

(22) PCT Filed: May 2, 2022

(86) PCT No.: PCT/IB2022/054040
§ 371 (c)(1),
(2) Date: Oct. 27, 2023

(87) PCT Pub. No.: WO2022/229937
PCT Pub. Date: Nov. 3, 2022

(65) Prior Publication Data
US 2024/0216010 A1 Jul. 4, 2024

(30) Foreign Application Priority Data

Apr. 30, 2021 (PT) .......................................... 117204
Apr. 30, 2021 (PT) .......................................... 117205

(51) Int. Cl.
*A61B 34/30* (2016.01)
*A61B 1/307* (2006.01)
(Continued)

(52) U.S. Cl.
CPC .......... *A61B 17/3403* (2013.01); *A61B 1/307* (2013.01); *A61B 34/10* (2016.02);
(Continued)

(58) Field of Classification Search
CPC ......... A61B 34/00; A61B 34/10; A61B 34/30; A61B 34/20; A61B 90/00; A61B 90/37; A61B 17/3403
See application file for complete search history.

(56) References Cited

U.S. PATENT DOCUMENTS 7,649,981 B2 * 1/2010 Seppi ..................... A61B 6/482
378/124
2014/0300720 A1 * 10/2014 Rothberg ............. A61B 8/4427
348/163
(Continued)

FOREIGN PATENT DOCUMENTS

EP 2590551 B1 11/2019
EP 2642917 B1 12/2019
(Continued)

OTHER PUBLICATIONS

Barfoot, Timothy D. et al. "Associating Uncertainty with Three-Dimensional Poses for Use in Estimation Problems," IEEE Trans. Robot., vol. 30, No. 3, pp. 679-693, Jun. 2014.
(Continued)

*Primary Examiner* — Vi X Nguyen
(74) *Attorney, Agent, or Firm* — Jason H. Vick; Amped IP LLC (57) ABSTRACT

Guided percutanous device and method for providing visual representations of organ registration and tracking during a
(Continued)

guided percutaneous procedure using an electromagnetic tracking (EMT) system comprising an EMT field generator and tracker defining an EMT coordinate system, a catheter with a EMT sensor for placing in the organ to indicate a percutaneous procedure target, a needle with an EMT sensor, an ultrasound (US) probe with an EMT sensor, and an electronic data processor configured for carrying out the steps of: loading preoperative imaging data; receiving 3D poses of the catheter, needle and US probe from the EMT; receiving intraoperative imaging data; calculating transformation matrices and multiplying said matrices to transform said imaging data and needle pose to a catheter pose; generating a visual representation of the transformed imaging data and needle pose for displaying on a user interface; generating a visual representation of the transformed registered preoperative imaging data for displaying on a user interface.

31 Claims, 5 Drawing Sheets

(51) Int. Cl.
    *A61B 17/34*     (2006.01)
    *A61B 34/00*     (2016.01)
    *A61B 34/10*     (2016.01)
    *A61B 34/20*     (2016.01)
    *A61B 90/00*     (2016.01)

(52) U.S. Cl.
    CPC .............. *A61B 34/20* (2016.02); *A61B 34/25* (2016.02); *A61B 90/37* (2016.02); *A61B 2034/105* (2016.02); *A61B 2034/2051* (2016.02); *A61B 2034/2074* (2016.02); *A61B 2090/3782* (2016.02)

(56) References Cited

U.S. PATENT DOCUMENTS

2019/0336101 A1\* 11/2019 Chiang .................... A61B 1/00
2021/0007774 A1   1/2021 Rodrigues et al.

FOREIGN PATENT DOCUMENTS

WO   WO 2010/067188 A1   6/2010
WO   WO 2018/222751 A1   12/2018
WO   WO 2020/234070 A1   11/2020

OTHER PUBLICATIONS

International Preliminary Report on Patentability for corresponding International Application No. PCT/IB2022/053989, mailed Nov. 9, 2023.
International Preliminary Report on Patentability for International Application No. PCT/IB2022/054040, mailed Nov. 9, 2023.
U.S. Appl. No. 18/288,777, filed Oct. 27, 2023, Gomes Da Fonseca et al.
Eade, Ethan "Lie Groups for Computer Vision" Cambridge Univ., Cam-bridge, UK, Tech. Rep 2 (2014).
Formella, Arno et al. "Ray Tracing: A quantitative analysis and a New Practical Algorithm" The Visual Computer; vol. 11, No. 9, pp. 465-476, May 1995.
Gomes-Fonseca, Joao et al "Surface-Based Registration Between CT and US for Image-Guided Percutaneous Renal Access—A feasibility Study" Medical Physics, vol. 46, No. 3, pp. 1115-1126, Mar. 2019.
Guan, Shao-Ya et al. "A Review of Point Feature Based Medical Image Registration" Chinese Journal of Mechanical Engineering, vol. 31, No. 1, p. 76, Dec. 2018.
Mangelson, J.G. et al. "Characterizing the Uncertainty of Jointly Distributed Poses in the Lie Algebra," arXiv. arXiv, Jun. 18, 2019.
Myronenko, Andriy et al. "Point Set Registration: Coherent Point Drift" IEEE Transactions on Pattern Analysis and Machine Intelligence, vol. 32, No. 12, pp. 2262-2275, Dec. 2010.
Oliveira, Bruno et al. "A Novel Multi-Atlas Strategy with Dense Deformation Field Reconstruction for Abdominal and Thoracic Multi-Organ Segmentation from Computed Tomography" Medical Image Analysis; vol. 45, pp. 108-120, Apr. 2018.
Queiros, Sandro et al. "MITT: Medical Image Tracking Toolbox" IEEE Transactions on Medical Imaging, vol. 37, No. 11, pp. 2547-2557, Nov. 2018.
Rodrigues, Pedro L. et al. "Validation of percutaneous puncture trajectory during renal access using 4D ultrasound reconstruction" Progress in Biomedical Optics and Imaging—Proceedings of SPIE. 9415. 10.1117/12.2082528; Mar. 18, 2015.
Zhu, Hao et al. "A Review of Point Set Registration: From Pairwise Registration to Groupwise Registration" Sensors, vol. 19, No. 5, p. 1191, Mar. 2019.
International Search Report for corresponding International Application No. PCT/IB2022/053989, mailed Sep. 2, 2022.
Written Opinion for corresponding International Application No. PCT/IB2022/053989, mailed Sep. 2, 2022.
International Search Report for International Application No. PCT/IB2022/054040, mailed Sep. 2, 2022.
Written Opinion for International Application No. PCT/IB2022/054040, mailed Sep. 2, 2022.
Kellermeier, Markus et al. "Electromagnetic Tracking (EMT) Technology for Improved Treatment Quality Assurance in Interstitial Brachytherapy" Radiation Oncology Physics; Wiley; J Appl Clin Med Phys 2017; 18; 211-222; Accepted Oct. 27, 2016.
Office Action (Restriction Requirement) for U.S. Appl. No. 18/288,777, mailed Jul. 2, 2025.

\* cited by examiner

METHOD AND DEVICE FOR REGISTRATION AND TRACKING DURING A PERCUTANEOUS PROCEDURE

CROSS REFERENCE TO RELATED APPLICATIONS

This application is a National Phase Application under 35 U.S.C. 371 of PCT Application No. PCT/IB2022/054040 having an international filing date of 2 May 2022 which designated the United States, which PCT application claimed the benefit of Portuguese Patent Application No. 117204 filed 30 Apr. 2021 and Portuguese Patent Application No. 117205 filed 30 Apr. 2021, each of which are incorporated herein by reference in their entirety.

TECHNICAL FIELD

The present disclosure relates to a method and device for organ registration and tracking during a percutaneous procedure, in particular allowing patient and instrument repositioning during said procedure.

BACKGROUND

In percutaneous procedures, reaching a target site precisely without damaging adjacent organs or tissues is a well desired outcome. Providing tools for aiding surgeons in safely performing a percutaneous procedure access is an important need addressed by the present disclosure. In particular, safely performing percutaneous procedure access to the kidney is of interest.

Document EP2590551B1 discloses methods, systems, and programming for surgical procedure assistance. In particular, the present teaching relates to methods, systems, and programming for real-time surgical procedure assistance using an electronic organ map.

Document EP2642917B1 discloses an interactive three-dimensional (3D) anatomic mapping in 3D space displayed on computer screens and more particularly with the aim of providing extra guidance during soft organ surgery applications.

These facts are disclosed in order to illustrate the technical problem addressed by the present disclosure.

GENERAL DESCRIPTION

The present disclosure relates to a method and device for organ registration and tracking during a percutaneous procedure, in particular allowing patient and instrument repositioning during said procedure.

The present disclosure relates to a method and device provided for aiding guided percutaneous procedures to an internal organ or organs (and nearby organs), in particular the kidney (and nearby organs). The system operates intraoperative images tracked with an unobstructed real-time tracking system and uses visual reconstructions of the intraoperative and preoperative data of the patient's anatomy to identify targets and important anatomical structures in the target organ or organs (and nearby organs).

The present disclosure relates to the use of an electromagnetic tracking (EMT) system comprising an EMT field generator and tracker, thus defining an EMT coordinate system, for real-time tracking of one or more EMT sensors.

During the surgical procedure, the whole data is referenced to a sensor (for example a tracked catheter) inside an organ, for example the kidney, which improves intraoperative imaging acquisition and subsequently the registration between pre- and intraoperative data, enabling tracking the movement of the organ (the kidney, for example) after registration and dynamically compensate for motion. Furthermore, the tracked reference sensor (for example, catheter) can be used as a target for supporting percutaneous access. Moreover, knowing that all data can be linked to the tracked sensor, it is possible to reposition the tracker and patient's body during the surgical procedure, minimizing the risks of misregistration. Furthermore, if the tracked sensor must be repositioned, misregistration can be avoided by momentarily relocating the registered data.

One of the main advantages of the present disclosure is that the percutaneous procedure can be continued even if either of the patient, or the EMT tracker or the reference EMT sensor requires repositioning, while visual reconstructions of the intraoperative and preoperative data of the patient's anatomy are kept registered, thus ensuring continued aided guidance to the internal organ or organs.

Without the presently disclosed device and method, in the case of patient, EMT tracker or reference EMT sensor repositioning, the percutaneous procedure would have to be continued without aided guidance or, alternatively, risking misregistration errors.

Without the present disclosure, in the case of patient, EMT tracker or reference EMT sensor repositioning, the percutaneous procedure may have to be interrupted and continued after a new re-registration step.

One of the advantages of the disclosure is thus that it allows minimizing the risk of puncturing organs other than the organ of interest, e.g., the kidney, reducing surgical complications associated with this surgical step.

Another advantage of the disclosure, lies in that when the reference EMT sensor (e.g. the catheter sensor) requires repositioning, the user interface can ensure a visual representation of the preoperative and intraoperative US imaging data where the repositioning of the reference EMT sensor is not perceptible by the user of the device.

Yet another advantage of the disclosure is thus to promote a fast and less risky percutaneous procedure, reducing procedure time, avoiding the risk of multiple puncture tracts, decreasing patient harm, and improving the clinical outcome of subsequent surgical steps.

The disclosure is also advantageous in linking a plurality of intraoperative and preoperative imaging data to the world view of the tracked reference sensor (for example, catheter), which is positioned at or near an organ. This allows to compensate for respiratory and internal movements during image acquisition and during the percutaneous procedure.

Furthermore, reconstructions of the intraoperative data of the patient's anatomy are obtained with higher accuracy, which allows a more accurate registration and thus less risk for the percutaneous procedure.

In particular, the person carrying out the procedure has less risks of a certain trajectory hitting undesired organs or body parts, better planning the puncturing entry point and path, and thus reducing the risk of backtracking the needle to attempt a new puncturing direction.

The provided accurate and continued visual representations of registered intraoperative and preoperative data enables the surgeon, i.e. the person carrying out the procedure, with a practical and perceptible way to understand the clinical situation of the needle and the patient.

It is disclosed a guided percutaneous device for providing visual representations of organ registration and tracking during a guided percutaneous procedure using an electromagnetic tracking (EMT) system comprising an EMT field generator and tracker defining an EMT coordinate system, a catheter with a EMT sensor for placing in the organ to indicate a percutaneous procedure target, a needle with an EMT sensor, an ultrasound (US) probe with an EMT sensor, and an electronic data processor configured for carrying out the preceding calibration steps of:

tracking a reference object using the EMT system, said object comprising a plurality of reference points with known positions in said object;

receiving, from the US probe, US imaging data from the reference object and, simultaneously, receiving from the EMT system a set of three-dimensional (3D) poses, each pose comprising a position and orientation, of the US probe when imaging said reference object;

identifying said reference points in the received US imaging data;

calculating a probe calibration transformation matrix ($^{P}T_{US}$) by matching the identified reference points in the received US imaging data with the tracked reference points in an EMT coordinate system; and wherein the electronic data processor is configured for carrying out the steps of:

loading preoperative imaging data represented in respect of predetermined coordinates of preoperative images (CT);

receiving 3D poses of the catheter, needle and US probe tracked in real-time from the EMT system;

receiving intraoperative imaging data from the US probe represented in respect of predetermined coordinates of intraoperative US images;

calculating an EMT-catheter transformation matrix ($^{C}T_{Tr}$) from the received pose of the catheter;

calculating a probe-EMT transformation matrix ($^{Tr}T_{P}$) from the received pose of the US probe;

calculating a needle-EMT transformation matrix ($^{Tr}T_{N}$) from the received pose of the US probe;

multiplying the EMT-catheter transformation matrix ($^{C}T_{Tr}$) by the probe-EMT transformation matrix ($^{Tr}T_{P}$) for obtaining a probe-catheter transformation matrix ($^{C}T_{P}$) which represents the pose of the probe in respect of the catheter pose.

multiplying the probe-catheter transformation matrix ($^{C}T_{P}$) by the probe calibration transformation matrix ($^{P}T_{US}$) for obtaining an intraoperative-catheter transformation matrix ($^{C}T_{US}$) which represents said coordinates of intraoperative imaging data in respect of the catheter pose;

multiplying the EMT-catheter transformation matrix ($^{C}T_{Tr}$) by the needle-EMT transformation matrix ($^{Tr}T_{N}$) for obtaining a needle-catheter transformation matrix ($^{C}T_{N}$) which represents the pose of the needle in respect of the catheter pose.

registering ($T_{reg}$) the loaded preoperative imaging data into the intraoperative US imaging data;

transforming the intraoperative US imaging data with the obtained intraoperative-catheter transformation matrix ($^{C}T_{US}$);

transforming the registered preoperative imaging data with the obtained intraoperative-catheter transformation matrix ($^{C}T_{US}$);

transforming the received pose of the needle with the needle-catheter transformation matrix ($^{C}T_{N}$);

generating a visual representation of the transformed intraoperative US imaging data for displaying on a user interface;

generating a visual representation of the transformed registered preoperative imaging data for displaying on the user interface.

generating a visual representation of the transformed needle pose for displaying on a user interface.

In an embodiment, the electronic data processor is further configured for generating a visual representation of catheter position for displaying on the user interface, in particular a visual representation of catheter pose for displaying on the user interface.

In an embodiment, the electronic data processor is further configured for, when a user indication has been received that the tracked catheter is intended to be repositioned, carrying out the additional steps:

calculating a catheter-EMT transformation matrix ($^{Tr}T_{C}$) from the received pose of the catheter or from inverting the EMT-catheter transformation matrix ($^{C}T_{Tr}$);

initiate and maintain the application of a repositioning transformation to the transformed intraoperative US imaging data, transformed registered preoperative imaging data, and transformed needle pose by pre-multiplying the catheter-EMT transformation matrix ($^{Tr}T_{C}$), before generating visual representations.

In an embodiment, the electronic data processor is further configured for, when a user indication has been received that the tracked catheter has been repositioned, carrying out the additional steps:

cease the application of the repositioning transformation.

In an embodiment, the electronic data processor is further configured for carrying out the following steps, before the step of registering the loaded preoperative imaging data into the intraoperative US imaging data, for a coarse pre-registering of the loaded preoperative imaging data with the EMT coordinate system:

receiving from a user an input indicating a coarse pose of a patient in respect of the EMT tracker;

calculating a CT-EMT transformation matrix ($^{Tr}T_{CT}$) from the received coarse pose; transforming the loaded preoperative imaging data with the CT-EMT transformation matrix ($^{Tr}T_{CT}$);

using the transformed preoperative imaging data as the loaded preoperative imaging data of the registering step.

In an embodiment, a device for providing visual representations of organ registration and tracking during a guided percutaneous procedure using an operating table (Ta) with an EMT sensor, comprises the electronic data processor further configured for carrying out the steps of:

receiving a 3D pose of the operating table (Ta) tracked in real-time from the EMT system;

calculating a Ta-EMT transformation matrix ($^{Tr}T_{Ta}$) from the received pose of the operating table;

multiplying the EMT-catheter transformation matrix ($^{C}T_{Tr}$) by the Ta-EMT transformation matrix ($^{Tr}T_{Ta}$) for obtaining a Ta-catheter transformation matrix ($^{C}T_{Ta}$) which represents the pose of the operating table in respect of the catheter pose;

using Ta-catheter transformation matrix ($^{C}T_{Ta}$) to define an up-vector direction for aligning a 3D camera view of the visual representations.

In an embodiment, the 3D poses tracked in real-time via the EMT system are tracked through point EMT sensors.

In an embodiment, the point EMT sensors are placed on a tip of the catheter and on a tip of the needle.

In an embodiment, the user interface is a 2D display, a 3D display, a virtual-reality display or an augmented-reality display.

In an embodiment, the catheter is for positioning in a working channel in the organ by a flexible ureterorenoscope.

In an embodiment, the preoperative imaging data comprises 3D organ model or models previously reconstructed from preoperative MRI or CT images.

In an embodiment, the intraoperative imaging data comprises 3D organ model or models reconstructed from intraoperative US images.

In an embodiment, the organ is a kidney and the guided percutaneous procedure is a percutaneous renal access.

In an embodiment, the electronic data processor is further configured for repeatedly recalculating said matrices and regenerating said visual representations.

In an embodiment, the electronic data processor is further configured for: loading additional preoperative imaging data of a body region that is not subject to respiratory movement, represented in respect of predetermined coordinates of the previous preoperative images (CT);
  multiplying the probe-EMT transformation matrix ($^{Tr}T_P$) by the probe calibration transformation matrix ($^{P}T_{US}$) for obtaining an intraoperative-EMT transformation matrix ($^{Tr}T_{US}$) which represents said coordinates of intraoperative imaging data in respect of the tracker pose;
  transforming the loaded additional preoperative imaging data by the same registering ($T_{reg}$) of the preoperative imaging data into the intraoperative US imaging data;
  transforming the registered additional preoperative imaging data with the obtained intraoperative-EMT transformation matrix ($^{Tr}T_{US}$);
  generating a visual representation of the transformed registered additional preoperative imaging data for displaying on the user interface.

It is also disclosed a method for providing visual representations of organ registration and tracking during a guided percutaneous procedure using an electromagnetic tracking (EMT) system comprising an EMT field generator and tracker defining an EMT coordinate system, a catheter with a EMT sensor for placing in the organ to indicate a percutaneous procedure target, a needle with an EMT sensor, an ultrasound (US) probe with an EMT sensor, the method comprising the calibration steps of:
  tracking a reference object using the EMT system, said object comprising a plurality of reference points with known positions in said object;
  receiving, from the US probe, US imaging data from the reference object and, simultaneously, receiving from the EMT system a set of 3D poses, each pose comprising a position and orientation, of the US probe when imaging said reference object;
  identifying said reference points in the received US imaging data;
  calculating a probe calibration transformation matrix ($^{P}T_{US}$) by matching the identified reference points in the received US imaging data with the tracked reference points in an EMT coordinate system; and
wherein the method further comprises the steps of:
  loading preoperative imaging data represented in respect of predetermined coordinates of preoperative images (CT);
  receiving 3D poses of the catheter, needle and US probe tracked in real-time from the EMT system;
  receiving intraoperative imaging data from the US probe represented in respect of predetermined coordinates of intraoperative US images;
  calculating an EMT-catheter transformation matrix ($^{C}T_{Tr}$) from the received pose of the catheter;
  calculating a probe-EMT transformation matrix ($^{Tr}T_P$) from the received pose of the US probe;
  calculating a needle-EMT transformation matrix ($^{Tr}T_N$) from the received pose of the US probe;
  multiplying the EMT-catheter transformation matrix ($^{C}T_{Tr}$) by the probe-EMT transformation matrix ($^{Tr}T_P$) for obtaining a probe-catheter transformation matrix ($^{C}T_P$) which represents the pose of the probe in respect of the catheter pose.
  multiplying the probe-catheter transformation matrix ($^{C}T_P$) by the probe calibration transformation matrix ($^{P}T_{US}$) for obtaining an intraoperative-catheter transformation matrix ($^{C}T_{US}$) which represents said coordinates of intraoperative imaging data in respect of the catheter pose;
  multiplying the EMT-catheter transformation matrix ($^{C}T_{Tr}$) by the needle-EMT transformation matrix ($^{Tr}T_N$) for obtaining a needle-catheter transformation matrix ($^{C}T_N$) which represents the pose of the needle in respect of the catheter pose.
  registering ($T_{reg}$) the loaded preoperative imaging data into the intraoperative US imaging data;
  transforming the intraoperative US imaging data with the obtained intraoperative-catheter transformation matrix ($^{C}T_{US}$);
  transforming the registered preoperative imaging data with the obtained intraoperative-catheter transformation matrix ($^{C}T_{US}$);
  transforming the received pose of the needle with the needle-catheter transformation matrix ($^{C}T_N$);
  generating a visual representation of the transformed intraoperative US imaging data for displaying on the user interface;
  generating a visual representation of the transformed registered preoperative imaging data for displaying on the user interface.
  generating a visual representation of the transformed needle pose for displaying on a user interface.

In an embodiment, the method further comprises generating a visual representation of catheter position for displaying on the user interface, in particular a visual representation of catheter pose for displaying on the user interface.

In an embodiment, the method comprises, when a user indication has been received that the tracked catheter is intended to be repositioned, the following additional steps:
  calculating a catheter-EMT transformation matrix ($^{Tr}T_C$) from the received pose of the catheter or from inverting the EMT-catheter transformation matrix ($^{C}T_{Tr}$);
  initiate and maintain the application of a repositioning transformation to the transformed intraoperative US imaging data, transformed registered preoperative imaging data, and transformed needle pose by pre-multiplying the catheter-EMT transformation matrix ($^{Tr}T_C$), before generating visual representations.

In an embodiment, the method comprises, when a user indication has been received that the tracked catheter has been repositioned, the following additional steps:
  cease the application of the repositioning transformation.

In an embodiment, the method comprises, before the step of registering the loaded preoperative imaging data into the intraoperative US imaging data, for a coarse pre-registering of the loaded preoperative imaging data with the EMT coordinate system, the following steps:
  receiving from a user an input indicating a coarse pose of a patient in respect of the EMT tracker;
  calculating a CT-EMT transformation matrix ($^{Tr}T_{Cr}$) from the received coarse pose;

transforming the loaded preoperative imaging data with the CT-EMT transformation matrix ($^{Tr}T_{Cr}$);

using the transformed preoperative imaging data as the loaded preoperative imaging data of the registering step.

In an embodiment, the method comprises, for providing visual representations of organ registration and tracking during a guided percutaneous procedure using an operating table (Ta) with an EMT sensor, the steps of:

receiving a 3D pose of the operating table (Ta) tracked in real-time from the EMT system;

calculating a Ta-EMT transformation matrix ($^{Tr}T_{Ta}$) from the received pose of the operating table;

multiplying the EMT-catheter transformation matrix ($^{C}T_{Tr}$) by the Ta-EMT transformation matrix ($^{Tr}T_{Ta}$) for obtaining a Ta-catheter transformation matrix ($^{C}T_{Ta}$) which represents the pose of the operating table in respect of the catheter pose.

using Ta-catheter transformation matrix ($^{C}T_{Ta}$) to define an up-vector direction for aligning a 3D camera view of the visual representations.

An embodiment of the disclosed method comprises the following additional steps:

loading additional preoperative imaging data of a body region that is not subject to respiratory movement, represented in respect of predetermined coordinates of the previous preoperative images (CT);

multiplying the probe-EMT transformation matrix ($^{Tr}T_{P}$) by the probe calibration transformation matrix ($^{P}T_{US}$) for obtaining an intraoperative-EMT transformation matrix ($^{Tr}T_{US}$) which represents said coordinates of intraoperative imaging data in respect of the tracker pose;

transforming the loaded additional preoperative imaging data by the same registering ($T_{reg}$) of the preoperative imaging data into the intraoperative US imaging data;

transforming the registered additional preoperative imaging data with the obtained intraoperative-EMT transformation matrix ($^{Tr}T_{US}$);

generating a visual representation of the transformed registered additional preoperative imaging data for displaying on the user interface.

It is also disclosed a non-transitory computer-readable medium comprising computer program instructions for implementing a guided percutaneous device for providing visual representations of organ registration and tracking during a guided percutaneous procedure using an electromagnetic tracking (EMT) system, which when executed by a processor, cause the processor to carry out any of the disclosed methods.

BRIEF DESCRIPTION OF THE DRAWINGS

The following figures provide preferred embodiments for illustrating the disclosure and should not be seen as limiting the scope of disclosure.

DETAILED DESCRIPTION

The present disclosure relates to a method and device for organ registration and tracking during a percutaneous procedure, in particular allowing patient and instrument repositioning during said procedure.

Figure 1:
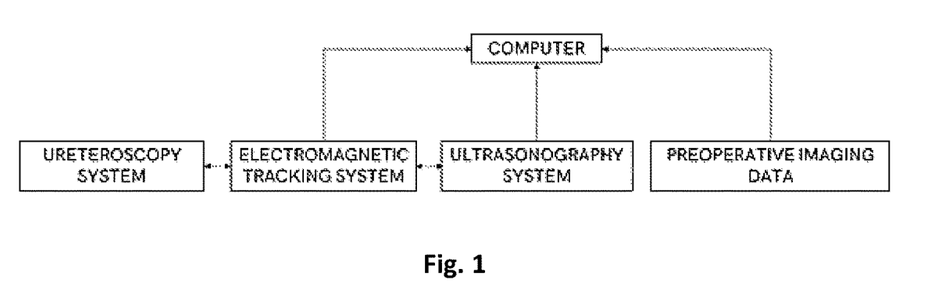
FIG. 1: Schematic representation of an embodiment of the systems used in this disclosure.

FIG. 1 summarizes the systems required in this disclosure. This disclosure includes an electromagnetic tracking (EMT) system, a ureteroscopy system, an ultrasonography system, and a computer (i.e. electronic data processor) with navigation software where registration between pre- and intraoperative data is performed followed by computer-assisted percutaneous renal access.

The EMT system allows tracking of surgical instruments both inside and outside the patient's body. The electromagnetic sensors are rigidly attached to ultrasound (US) probe, needle tip and catheter tip. Orientational and positional data of all sensors are collected by the EMT system and streamed to the computer.

Ureteroscopy is used to position the catheter in the correct calyx inside the kidney. The catheter creates a rigid relationship between the kidney and the catheter tip, allowing tracking the kidney position in real-time (e.g., measuring respiratory movements) and targeting the calyx to be punctured.

US images are sent to the computer, and their position and orientation are given by the EMT sensor attached to the US probe. The images and transformations data are streamed to the navigation software in real-time.

Running in a computer, the software allows the segmentation and registration of preoperative and intraoperative imaging data, representing anatomical patient's data virtually. It also includes navigation features, such as: the projection of the needle trajectory and catheter over the US images, as well as their visualization in the 3D virtual environment; the referencing of the pre- and intraoperative registration to the catheter allowing continuous organ-tracking and, thus, compensating respiratory and internal organ movements; and a needle guidance interface for visual feedback during puncture.

In an embodiment, FIG. 1 shows the systems required in this disclosure. An EMT system is used to obtain the position and orientation of surgical instruments and reference the patient's body. The ureteroscopy system is used as a vehicle to introduce an EMT catheter into the patient's body through natural orifices, i.e. from the urethra until the renal calyx. The ultrasonography system allows the acquisition of intraoperative images of the patient being each image tracked using the EMT system. Preoperative images (e.g., CT—computed tomography or MRI—magnetic resonance imaging) are used to enhance intraoperative data. The computer combines the whole information provided by the abovementioned systems into a virtual environment.

Figure 2:
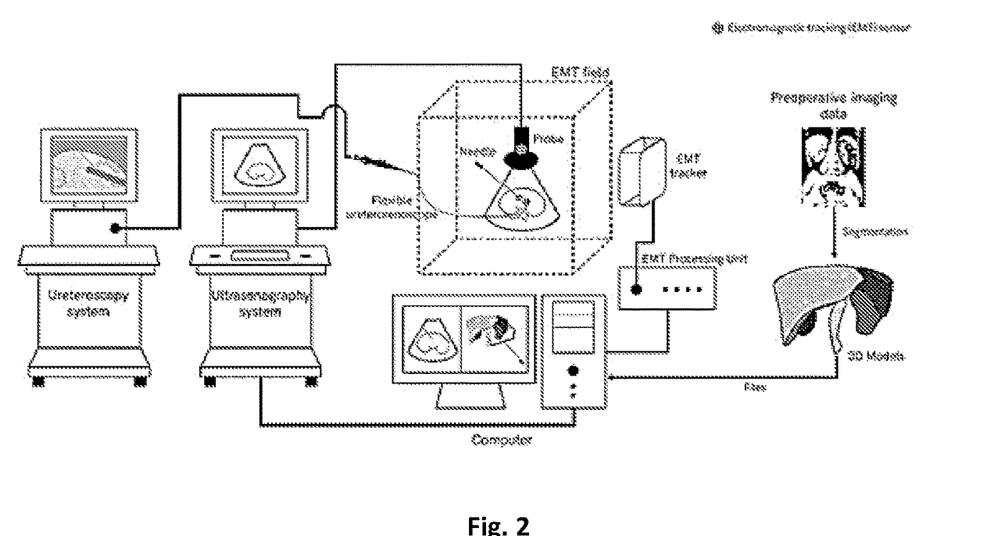
FIG. 2: Schematic representation of an embodiment of the systems and data involved in the scope of the proposed disclosure.

In an embodiment, FIG. 2 illustrates the systems and data involved in the scope of the proposed invention. The proposed invention uses an EMT system to track surgical instruments and organs, being able to reference them into the same coordinates' system (or space).

A flexible ureterorenoscope is positioned inside the renal collecting system and a tracked catheter is inserted in the working channel until the tip of the flexible ureterorenoscope.

Alternatively, and generally, the target site can be a tracked catheter point (typically the tip) or a tracked ureterorenoscope point (typically the tip) or any anatomic target tracked by an EMT sensor which has been previously placed to indicate said target for the percutaneous procedure.

A tracked probe is used to acquire US images of a patient's anatomy, which data are grabbed into the computer's memory. Preoperative imaging data are segmented, and the resulting models are used in a specific navigation software, running in the computer, which registers preoperative and intraoperative imaging data to enhance percutaneous renal access.

Percutaneous renal access is performed using a tracked needle which is guided until a target site in real-time.

Figure 3:
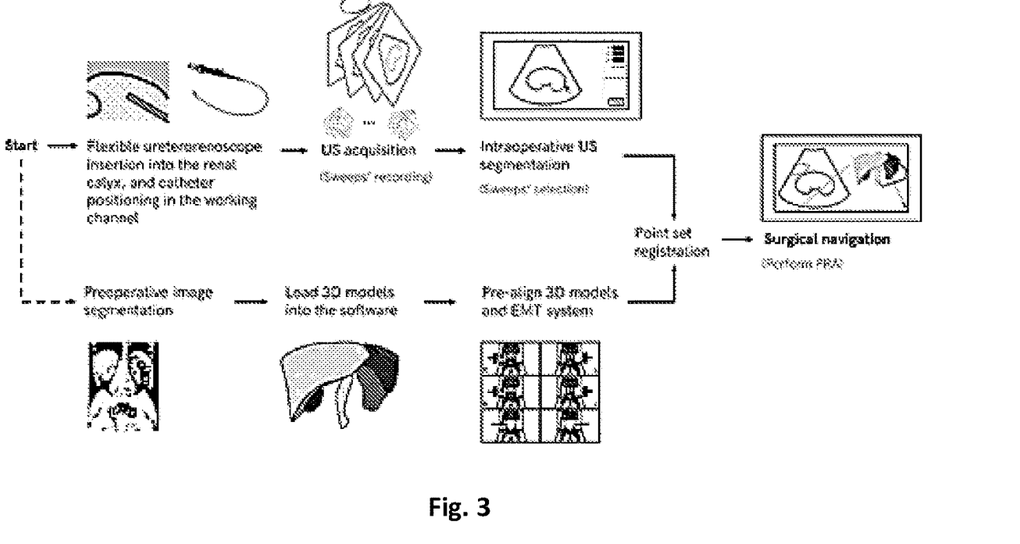
FIG. 3: Schematic representation of the clinical workflow.

The following pertains to preoperative image segmentation. Preoperative data must be prepared by segmenting the kidney and nearby organs before intraoperative registration. Semi-automatic and automatic methods may be applied to obtained 3D models representing the patient's anatomy (FIG. 3).

Multi-atlas segmentation (MAS) strategies have been widely used to solve the problem of multiple organ segmentation. This approach performs multiple registrations between the target image and a set of known atlases, combining their results to obtain the final segmentation. In the embodiment of this invention, a spatially coherent MAS approach proposed in [1] is here employed. Contrarily to typical MAS strategies that subdivide the segmentation process into multiple ones (per organ), the employed approach maintains the spatial relationship among nearby organs. After an initial global alignment using the entire image, multiple local transformations are computed in the region of interest of each organ. Then, to guarantee spatial coherence, all local transformations are combined into a single map using a dense deformation field reconstruction. Additionally, a deformable registration method is applied to refine the atlas information to the patient-specific anatomy. Finally, a label fusion strategy is used, which employs an organ-wise statistical selection method and a local weight voting strategy. The former eliminates the worst registered atlases per organ, while the latter assigns a different weight to each voxel per its similarity with the same anatomical position in the unlabelled image.

Moreover, additional strategies based on machine or deep learning can be applied to perform preoperative image segmentation.

The following pertains to intraoperative sweeps recording. First, intraoperatively, the surgeon must sweep the puncture zone with a tracked US probe and the software records the US images and the pose data into the computer's memory. Several sweeps can be performed and recorded. These sweeps must be focused on acquiring the organ under evaluation in all frames and preferentially with a wide coverage range and without repeating anatomical zones. Since the world origin is linked to the catheter, which is positioned inside the kidney through a flexible ureterorenoscope, all sweeps are captured based on this internal EMT sensor. This allows to compensate for respiratory and internal movements during image acquisition. Each sweep is added into a list of recordings, enabling the selection of which ones must be segmented and used when creating a partial or complete kidney model (FIG. 3).

In the embodiment of this disclosure, sweeps recording is performed in a different GUI that can be opened from the main one. Here, the surgeon can record several tracked US images of the kidney into the computer's memory. Indeed, it was observed in [2] that multiple sweeps along the central longitudinal plane of the kidney with a wider coverage range improved the final registration. The record and save processes are triggered by an interface button or a physical switch. The recording can be preceded by a preparation time, for example, 5 sec.

In an embodiment, FIG. 3 shows a schematic of the clinical workflow. After preparing and positioning the patient for surgery, a flexible ureterorenoscope is inserted from the urethra until the renal calyx and a catheter is positioned in the working channel. The tip of catheter must be visible in the ureteroscopy imaging. Then, US acquisition must be performed by recording several sweeps (i.e. set of US images) of the kidney and nearby organs. The selected sweeps are segmented and combined into a 3D model(s) to be registered with preoperative 3D model(s). The preoperative models are segmented and pre-align with the EMT system before the surgical procedure. Consequently, the preoperative and intraoperative data are registered using a point set registration method. Finally, both preoperative and intraoperative data are aligned and can be used to aid physician during percutaneous renal access.

The following pertains to intraoperative image segmentation. A semi-automatic or automatic method may be applied to the selected US sweeps to perform intraoperative image segmentation of the patient's anatomy.

In the embodiment of this invention, a semi-automatic segmentation strategy was proposed to partially reconstruct the kidney surface, where a manual delineation followed by a tracking algorithm is applied. The semi-automatic segmentation is initialized by manually segmenting one frame (freely chosen by the user). After confirming the delineation, a tracking algorithm can be triggered. Here, the Medical Imaging Tracking Toolbox (MITT) was used [3]. MITT is used for several reasons: it is versatile, easy to use and to incorporate, computationally efficient, and capable to track the contours even in noisy images or in the presence of artifacts, like shadows or echogenic changes. This is possible due to the anatomical topology and localized nature of the AAOF algorithm. Summarizing, MITT will propagate the initial contour to the remaining frames and using the transformations associated to each frame, it is possible to create a 3D segmentation of the organ of interest. The tracking settings can be changed before running the tracking algorithm, where three main parameters can be set, namely the size of the tracking neighborhood (box radius, mm), the influence of adjacent contour points on the tracking (sigma length, %), and the pre-processing image filtering (sigma gaussian, mm). Depending on the image size and number of frames, the run-time of the tracking algorithm varies between milliseconds to seconds. After running the tracking algorithm, it is possible to visualize, eliminate and correct the contours in all frames (if necessary), including propagating this correction to subsequent frames by running the tracking algorithm again. The abovementioned strategy can be performed in all recorded sweeps.

Moreover, additional strategies based on machine or deep learning can be applied to perform intraoperative image segmentation.

The following pertains to intraoperative point set registration. After performing the segmentation, the surgeon can choose, from the list of recordings, which sweeps can be used to reconstruct the kidney partially or completely.

In the embodiment of this disclosure, when the registration is activated (FIG. 4), the kidney model is built by merging the contours, $^{US}p_{us}$, which were previously transformed using the transformation matrix from US image to catheter associated to each tracked image ($^{C}T_{US}=^{C}T_{P}\,^{P}T_{US}$, where $^{P}T_{US}$ is the transformation from US image to probe's sensor, i.e. the calibration matrix, and, $^{C}T_{P}$, from probe's sensor to catheter updated in real-time). As result of this step, the contours are given with respect to the catheter, $^{C}p_{us}$.

Figure 4:
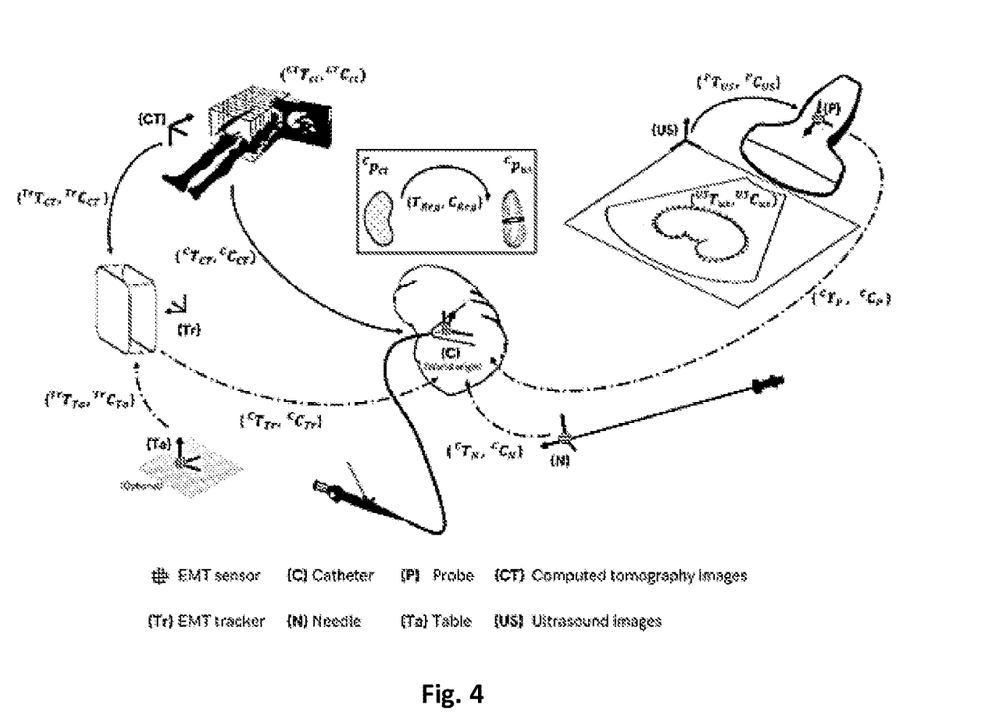
FIG. 4: Schematic representation of an overview of the components' transformations during intraoperative use.

Subsequently, the CT models can be uploaded and pre-aligned with the EMT system based on both patient and tracker's orientation in the operating room. Pre-configured transformations from CT images to tracker, $^{Tr}T_{CT}$, can be managed (FIG. 4).

Before computing the registration transformation between CT and US kidney models ($T_{Reg}$), a fixed transformation from CT models to the catheter, $^{C}T_{CT}$, is initially calculated to place the CT models in the same coordinate system of the US model:

$$^{C}T_{CT} = {}^{C}T_{Tr}\,^{Tr}T_{CT} \qquad (1)$$

where $^{C}T_{Tr}$ is a transformation from tracker to catheter. After applying this transformation, the CT models are given with respect to the catheter, $^{C}c$, as well.

Then, the CT and US kidney models are registered using a point set registration algorithm. Point set registration methods play an important role in medical image registration due to their simplicity, accuracy and low computational burden over intensity-based registration methods, mainly when multimodal registration is necessary [4]. In this context, recently, it was shown that a high accuracy can be obtained by aligning a partial intraoperative US model with a complete preoperative CT model of the kidney using a point set registration method [2]. In the embodiment of this invention, it is proposed to explore the potential of the coherent point drift (CPD) algorithm [5]. CPD is a robust and efficient pairwise point set registration method which fits into the probability-based category [6]. CPD is an extension of the Gaussian mixture model (GMM) for rigid and non-rigid registration. Therefore, it considers the registration of two point sets as a probability density estimation problem. One point set is represented by GMM centroids, and the other point set is fitted to those of the first point set by maximizing the likelihood and forcing GMM centroids to move coherently as a group, preserving the topological structure [5]. One of the crucial parameters of CPD is the weight parameter that specifies the expected ratio of noise and outlier points in point sets. Since we are expecting some noise, outliers and missing data among the point set extracted with the proposed semi-automatic segmentation strategy, namely due to contour drifting when using MITT or due to occlusions during image acquisition, CPD is an interesting option due to its low sensitivity to noise, high accuracy and robustness compared to other point set registration algorithms [4].

In an embodiment, FIG. 4 shows an overview of the components' transformations during intraoperative use. For illustrative purposes, the transformation matrices (T) are depicted together with the respective covariance matrices (C). All transformations are computed using the catheter as world origin. Dashed arrows represent transformations computed and updated from the tracked sensors in real-time, such as: tracker to catheter, $^{C}T_{Tr}$; probe to catheter, $^{C}T_{P}$; needle to catheter, $^{C}T_{N}$; and reference to tracker, $^{Tr}T_{R}$. Solid arrows represent static transformations computed pre- and intraoperatively, such as: probe calibration, $^{P}T_{US}$; CT to tracker prealignment, $^{Tr}T_{CT}$; CT to catheter, $^{C}T_{CT}={}^{C}T_{Tr}\,^{Tr}T_{CT}$; and CT-US registration, $T_{Reg}$. Registration is performed with both models in the catheter's local coordinates (or space), i.e., $^{C}p_{ct}$ and $^{C}p_{us}$. An EMT sensor in the surgical table can be used to inform on the real world's up-vector. All transformations belong to the three-dimensional (3D) space $\mathbb{R}^{3}$, where $T \in SE(3)$.

Indeed, the registration algorithm computes the transformation, $T_{Reg}$, from CT model, $^{C}p_{ct}$, to US model, $^{C}p_{us}$, ultimately fusing the preoperative data to the intraoperative stream. The transformation, $T_{Reg}$, updates the position of CT models relatively to catheter, as follows:

$$^{C}T_{CT}^{*} = T_{Reg}\,^{C}T_{Tr}\,^{Tr}T_{CT} \qquad (2)$$

Figure 5:
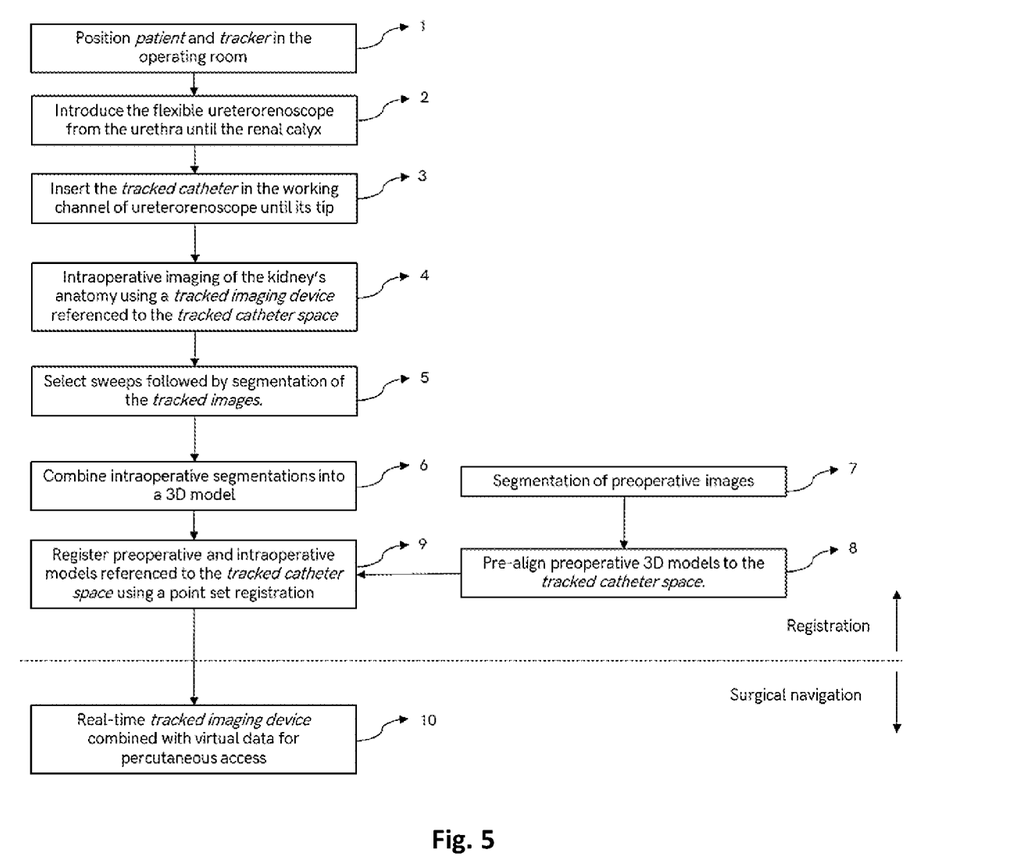
FIG. 5: Schematic representation of a flowchart of a complete procedure according to an embodiment.

All steps required to complete the registration process are described in the flowchart in FIG. 5.

In an embodiment, FIG. 5 shows a flowchart of the complete procedure, where: (1) represents a surgical position of the patient and the tracker are optimized in the operating room to cover the anatomical surgical area easing percutaneous renal access; (2) represents a flexible ureterorenoscope used to reach the correct calyx site on the kidney; (3) represents a tracked catheter inserted until the tip of the ureterorenoscope in order to obtain a reference location (world origin) and a specific target inside the kidney to enhance the registration process and support the percutaneous renal access, respectively; (4) represents an intraoperative imaging performed using the tracked imaging device (e.g., US imaging) which is referenced to the tracked catheter (positioned inside the kidney). Assuming a rigid relationship between the tracked catheter and the kidney, it is possible to compensate movements during intraoperative image acquisition, improving 3D kidney capturing. Sweeps may be performed and recorded into the computer's memory saving images and tracking data; (5) represents sweeps selected to be segmented. The segmentation process may be semi-automatic or automatic, mainly focused on kidney and nearby organs; (6) represents individual intraoperative segmentations on each image that may be then combined into a single 3D model. This 3D model represents partial information of the organ, and if required, this 3D model can be fully reconstructed using specific reconstruction techniques; (7) represents the segmentation of preoperative data (e.g., CT or MRI). Semi-automatic or automatic segmentation may be used to create a 3D representation of the patient's kidney and nearby organs; (8) represents segmented models which may be pre-aligned to the tracked catheter space (i.e., align patient and tracker spaces); (9) represents a registration of the preoperative and intraoperative data. The preoperative models are transformed to the tracked catheter space, meaning that all models are linked to the catheter that is inside the kidney. After registration, this linking helps to compensate for respiratory movements; (10) represents a percutaneous access that may be performed using a tracked needle and the available information, guiding the surgeon to the target site, and avoiding puncturing the nearby organs. Real-time images from the tracked imaging device are used to verify if there is a correspondence between preoperative and intraoperative 3D models and patient's anatomy. A virtual environment represents all information and guidance tips to aid the surgeon during renal access.

The following pertains to real-time surgical navigation. When the registration process is completed, the surgical navigation is activated. Since all information is register to the catheter (which is inside the kidney), the preoperative registered data, $^{C}p_{ct}$, moves with the catheter, following the intra-abdominal movements. During navigation, if the position of the catheter relative to the patient body does not change, patient or tracker repositioning are possible without losing the registration (FIG. 6).

Similarly, if required, one may also enable the catheter repositioning after registration, but neither patient nor tracker movements must occur while doing it. To this end, one may momentarily transform the registered data to the tracker, rather than the catheter, using $^{Tr}T_C$ (which represents the tracker pose with respect to the catheter at the instant of unfixing), and revert this operation upon finishing to reposition the catheter (FIG. 6).

These operations of relocating the registration data between parts of the EMT system without compromising the image fusion are only possible if an EMT sensor with six degrees-of-freedom is used for the catheter.

Figure 6:
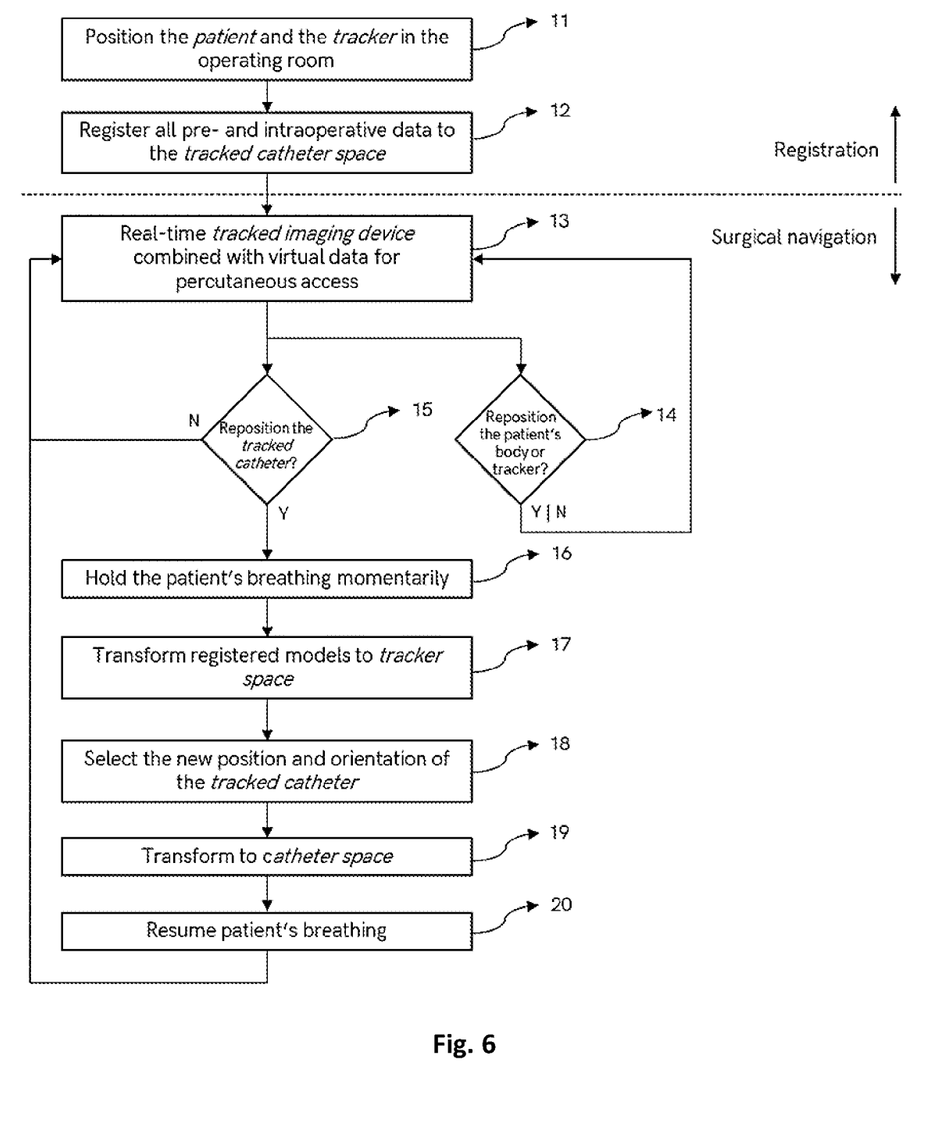
FIG. 6: Schematic representation of a flowchart of patient, tracker, and sensor repositioning according to an embodiment.

In an embodiment, FIG. 6 shows a flowchart of patient, tracker, and sensor repositioning, where: (11) represents point 1 of FIG. 5; (12) represents points 2 to 9 of FIG. 5; (13) represents point 10 of FIG. 5; (14) represents if repositioning of the tracker or patient's body is required, since the complete registration process was obtained based on the catheter space (which is inside the kidney), it is possible to move the tracker and patient's body without significantly change the alignment; (15) represents if repositioning of the catheter is required, it will lead to misregistration. To avoid this problem, relocating the registered data temporarily to the tracker is used; (16) represents respiratory movements that must be hold in a short term; (17) represents the transformation of the space to the tracker, which means that all the register data is now "attached" to the tracker. Perhaps, during surgical procedure, it can be activated with a physical switch or an interface button in the software; (18) represents the new orientation and position of the catheter that is then obtained, by moving the flexible ureterorenoscope; (19) represents when a new position is obtained, revert transformation to the catheter space, which means that all register data is again "attached" to the catheter; (20) represents then, resume breathing. Patient's vital signs must be evaluated continuously during the entire procedure.

Figure 7:
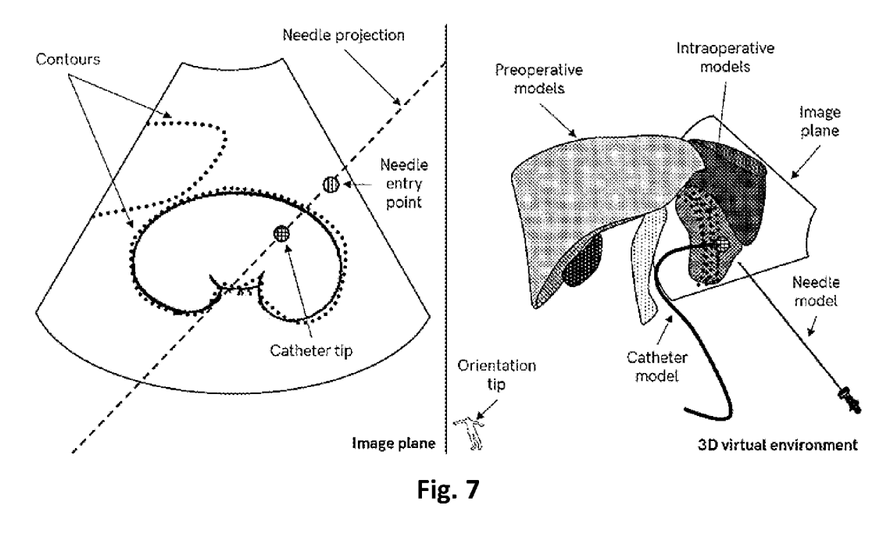
FIG. 7: Schematic representation of the graphical user interface (GUI) for surgical navigation according to an embodiment.

Furthermore, the navigation system comprises two guidance views which are combined in one GUI. These views can be used individually or together (FIG. 7). Each one is described as follows.

The following pertains to US image overlaid with needle projections and registered data. In this guidance view, the surgeon is capable to visualize in real-time the projections, entry point and contours of the needle, the catheter tip, and the contours from the registered preoperative models over the US images.

The following pertains to 3D virtual environment. The 3D virtual environment displays in real-time the pose of the tracked US images, 3D models of needle and catheter tip, registered preoperative models and intraoperative kidney model, as well as the trajectory of the needle. If necessary, the virtual environment can be rotated, panned, or zoomed to improve visualization.

In an embodiment, FIG. 7 shows a GUI for surgical navigation. The GUI presents two guidance views which are updated in real-time: Left: US image overlaid with needle projections and entry point, catheter tip, and contours from registered data. Right: The 3D virtual environment with registered preoperative models and surgical instruments. Intraoperative models can be visualized as well.

REFERENCES

[1] B. Oliveira et al., "A novel multi-atlas strategy with dense deformation field reconstruction for abdominal and thoracic multi-organ segmentation from computed tomography," Med. Image Anal., vol. 45, pp. 108-120, April 2018.

[2] J. Gomes-Fonseca et al., "Surface-based registration between CT and US for image-guided percutaneous renal access—A feasibility study," Med. Phys., vol. 46, no. 3, pp. 1115-1126, March 2019.

[3] S. Queiros, P. Morais, D. Barbosa, J. C. Fonseca, J. L. Vilaca, and J. D'Hooge, "MITT: Medical Image Tracking Toolbox," IEEE Trans. Med. Imaging, vol. 37, no. 11, pp. 2547-2557, November 2018.

[4] S.-Y. Guan, T.-M. Wang, C. Meng, and J.-C. Wang, "A Review of Point Feature Based Medical Image Registration," Chinese J. Mech. Eng., vol. 31, no. 1, p. 76, December 2018.

[5] A. Myronenko and Xubo Song, "Point Set Registration: Coherent Point Drift," IEEE Trans. Pattern Anal. Mach. Intell., vol. 32, no. 12, pp. 2262-2275, December 2010.

[6] H. Zhu et al., "A Review of Point Set Registration: From Pairwise Registration to Groupwise Registration," Sensors, vol. 19, no. 5, p. 1191, March 2019.

The term "comprising" whenever used in this document is intended to indicate the presence of stated features, integers, steps, components, but not to preclude the presence or addition of one or more other features, integers, steps, components or groups thereof.

It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

The disclosure should not be seen in any way restricted to the embodiments described and a person with ordinary skill in the art will foresee many possibilities to modifications thereof. The above described embodiments are combinable. The following claims further set out particular embodiments of the disclosure.

The invention claimed is:

1. A guided percutaneous device for providing visual representations of organ registration and tracking during a guided percutaneous procedure using an electromagnetic tracking (EMT) system comprising an EMT field generator and tracker defining an EMT coordinate system, a catheter with an EMT sensor for placing in the organ to indicate a percutaneous procedure target, a needle with an EMT sensor, an ultrasound (US) probe with an EMT sensor, and an electronic data processor configured for carrying out the preceding calibration steps of:

tracking a reference object using the EMT system, said object comprising a plurality of reference points with known positions in said object;

receiving, from the US probe, US imaging data from the reference object and, simultaneously, receiving from the EMT system a set of three-dimensional (3D) poses, each pose comprising a position and orientation, of the US probe when imaging said reference object;

identifying said reference points in the received US imaging data;

calculating a probe calibration transformation matrix ($^{P}T_{US}$) by matching the identified reference points in the received US imaging data with the tracked reference points in an EMT coordinate system; and wherein the electronic data processor is configured for carrying out the steps of:

loading preoperative imaging data represented in respect of predetermined coordinates of preoperative images (CT);

receiving 3D poses of the catheter, needle and US probe tracked in real-time from the EMT system;

receiving intraoperative imaging data from the US probe represented in respect of predetermined coordinates of intraoperative US images;

calculating an EMT-catheter transformation matrix ($^{C}T_{Tr}$) from the received pose of the catheter;

calculating a probe-EMT transformation matrix ($^{Tr}T_{P}$) from the received pose of the US probe;

calculating a needle-EMT transformation matrix ($^{Tr}T_{N}$) from the received pose of the US probe;

multiplying the EMT-catheter transformation matrix ($^{C}T_{Tr}$) by the probe-EMT transformation matrix ($^{Tr}T_{P}$) for obtaining a probe-catheter transformation matrix ($^{C}T_{P}$) which represents the pose of the probe in respect of the catheter pose;

multiplying the probe-catheter transformation matrix ($^{C}T_{P}$) by the probe calibration transformation matrix ($^{P}T_{US}$) for obtaining an intraoperative-catheter transformation matrix ($^{C}T_{US}$) which represents said coordinates of intraoperative imaging data in respect of the catheter pose;

multiplying the EMT-catheter transformation matrix ($^{C}T_{Tr}$) by the needle-EMT transformation matrix ($^{Tr}T_{N}$) for obtaining a needle-catheter transformation matrix ($^{C}T_{N}$) which represents the pose of the needle in respect of the catheter pose-;

registering ($T_{reg}$) the loaded preoperative imaging data into the intraoperative US imaging data;

transforming the intraoperative US imaging data with the obtained intraoperative-catheter transformation matrix ($^{C}T_{US}$);

transforming the registered preoperative imaging data with the obtained intraoperative-catheter transformation matrix ($^{C}T_{US}$);

transforming the received pose of the needle with the needle-catheter transformation matrix ($^{C}T_{N}$);

generating a visual representation of the transformed intraoperative US imaging data for displaying on an user interface;

generating a visual representation of the transformed registered preoperative imaging data for displaying on the user interface;

generating a visual representation of the transformed needle pose for displaying on the user interface.

2. The device according to claim 1, wherein the electronic data processor is further configured for generating a visual representation of catheter position for displaying on the user interface, in particular a visual representation of catheter pose for displaying on the user interface.

3. The device according to claim 1, wherein the electronic data processor is further configured for, when a user indication has been received that the tracked catheter is intended to be repositioned, carrying out the additional steps:

calculating a catheter-EMT transformation matrix ($^{Tr}T_{C}$) from the received pose of the catheter or from inverting the EMT-catheter transformation matrix ($^{C}T_{Tr}$);

initiate and maintain the application of a repositioning transformation to the transformed intraoperative US imaging data, transformed registered preoperative imaging data, and transformed needle pose by premultiplying the catheter-EMT transformation matrix ($^{Tr}T_{C}$), before generating visual representations.

4. The device according to claim 1, wherein the electronic data processor is further configured for, when a user indication has been received that the tracked catheter has been repositioned, carrying out the additional steps:

cease the application of the repositioning transformation.

5. The device according to claim 1, claims wherein the electronic data processor is further configured for carrying out the following steps, before the step of registering the loaded preoperative imaging data into the intraoperative US imaging data, for a coarse pre-registering of the loaded preoperative imaging data with the EMT coordinate system:

receiving from a user an input indicating a coarse pose of a patient in respect of the EMT tracker;

calculating a CT-EMT transformation matrix ($^{Tr}T_{CT}$) from the received coarse pose;

transforming the loaded preoperative imaging data with the CT-EMT transformation matrix ($^{Tr}T_{CT}$);

using the transformed preoperative imaging data as the loaded preoperative imaging data of the registering step.

6. The device according to claim 1, claims for providing visual representations of organ registration and tracking during a guided percutaneous procedure using an operating table (Ta) with an EMT sensor, wherein the electronic data processor is further configured for carrying out the steps of:

receiving a 3D pose of the operating table (Ta) tracked in real-time from the EMT system;

calculating a Ta-EMT transformation matrix ($^{Tr}T_{Ta}$) from the received pose of the operating table;

multiplying the EMT-catheter transformation matrix ($^{C}T_{Tr}$) by the Ta-EMT transformation matrix ($^{Tr}T_{Ta}$) for obtaining a Ta-catheter transformation matrix ($^{C}T_{Ta}$) which represents the pose of the operating table in respect of the catheter pose;

using Ta-catheter transformation matrix ($^{C}T_{Ta}$) to define an up-vector direction for aligning a 3D camera view of the visual representations.

7. The device according to claim 1, claims wherein the 3D poses tracked in real-time via the EMT system are tracked through point EMT sensors.

8. The device according to claim 1, wherein the point EMT sensors are placed on a tip of the catheter and on a tip of the needle.

9. The device according to claim 1, claims wherein the user interface is a 2D display, a 3D display, a virtual-reality display or an augmented-reality display.

10. The device according to claim 1, claims wherein the catheter is for positioning in a working channel in the organ by a flexible ureterorenoscope.

11. The device according to claim 1, wherein the preoperative imaging data comprises 3D organ model or models previously reconstructed from preoperative MRI or CT images.

12. The device according to claim 1, wherein the intraoperative imaging data comprises 3D organ model or models reconstructed from intraoperative US images.

13. The device according to claim 1, wherein the organ is a kidney and the guided percutaneous procedure is a percutaneous renal access.

14. The device according to claim 1, wherein the electronic data processor is further configured for repeatedly recalculating said matrices and regenerating said visual representations.

15. The device according to claim 1, wherein the electronic data processor is further configured for:
loading additional preoperative imaging data of a body region that is not subject to respiratory movement, represented in respect of predetermined coordinates of the previous preoperative images (CT);
multiplying the probe-EMT transformation matrix ($^{Tr}T_P$) by the probe calibration transformation matrix ($^{P}T_{US}$) for obtaining an intraoperative-EMT transformation matrix ($^{Tr}T_{US}$) which represents said coordinates of intraoperative imaging data in respect of the tracker pose;
transforming the loaded additional preoperative imaging data by the same registering ($T_{reg}$) of the preoperative imaging data into the intraoperative US imaging data;
transforming the registered additional preoperative imaging data with the obtained intraoperative-EMT transformation matrix ($^{Tr}T_{US}$);
generating a visual representation of the transformed registered additional preoperative imaging data for displaying on the user interface.

16. A method for providing visual representations of organ registration and tracking during a guided percutaneous procedure using an electromagnetic tracking (EMT) system comprising an EMT field generator and tracker defining an EMT coordinate system, a catheter with an EMT sensor for placing in the organ to indicate a percutaneous procedure target, a needle with an EMT sensor, an ultrasound (US) probe with an EMT sensor, the method comprising the calibration steps of:
tracking a reference object using the EMT system, said object comprising a plurality of reference points with known positions in said object;
receiving, from the US probe, US imaging data from the reference object and, simultaneously, receiving from the EMT system a set of 3D poses, each pose comprising a position and orientation, of the US probe when imaging said reference object;
identifying said reference points in the received US imaging data;
calculating a probe calibration transformation matrix ($^{P}T_{US}$) by matching the identified reference points in the received US imaging data with the tracked reference points in an EMT coordinate system; and
wherein the method further comprises the steps of:
loading preoperative imaging data represented in respect of predetermined coordinates of preoperative images (CT);
receiving 3D poses of the catheter, needle and US probe tracked in real-time from the EMT system;
receiving intraoperative imaging data from the US probe represented in respect of predetermined coordinates of intraoperative US images;
calculating an EMT-catheter transformation matrix ($^{C}T_{Tr}$) from the received pose of the catheter;
calculating a probe-EMT transformation matrix ($^{Tr}T_P$) from the received pose of the US probe;
calculating a needle-EMT transformation matrix ($^{Tr}T_N$) from the received pose of the US probe;
multiplying the EMT-catheter transformation matrix ($^{C}T_{Tr}$) by the probe-EMT transformation matrix ($^{Tr}T_P$) for obtaining a probe-catheter transformation matrix ($^{C}T_P$) which represents the pose of the probe in respect of the catheter pose;
multiplying the probe-catheter transformation matrix ($^{C}T_P$) by the probe calibration transformation matrix ($^{P}T_{US}$) for obtaining an intraoperative-catheter transformation matrix ($^{C}T_{US}$) which represents said coordinates of intraoperative imaging data in respect of the catheter pose;
multiplying the EMT-catheter transformation matrix ($^{C}T_{Tr}$) by the needle-EMT transformation matrix ($^{Tr}T_N$) for obtaining a needle-catheter transformation matrix ($^{C}T_N$) which represents the pose of the needle in respect of the catheter pose, registering ($T_{reg}$) the loaded preoperative imaging data into the intraoperative US imaging data;
transforming the intraoperative US imaging data with the obtained intraoperative-catheter transformation matrix ($^{C}T_{US}$);
transforming the registered preoperative imaging data with the obtained intraoperative-catheter transformation matrix ($^{C}T_{US}$);
transforming the received pose of the needle with the needle-catheter transformation matrix ($^{C}T_N$);
generating a visual representation of the transformed intraoperative US imaging data for displaying on an user interface;
generating a visual representation of the transformed registered preoperative imaging data for displaying on the user interface;
generating a visual representation of the transformed needle pose for displaying on the user interface.

17. The method according to claim 16, further comprising generating a visual representation of catheter position for displaying on the user interface, in particular a visual representation of catheter pose for displaying on the user interface.

18. The method according to claim 16 comprising, when a user indication has been received that the tracked catheter is intended to be repositioned, the following additional steps:
calculating a catheter-EMT transformation matrix ($^{Tr}T_C$) from the received pose of the catheter or from inverting the EMT-catheter transformation matrix ($^{C}T_{Tr}$);
initiate and maintain the application of a repositioning transformation to the transformed intraoperative US imaging data, transformed registered preoperative imaging data, and transformed needle pose by pre-multiplying the catheter-EMT transformation matrix ($^{Tr}T_C$), before generating visual representations.

19. The method according to claim 16 comprising, when a user indication has been received that the tracked catheter has been repositioned, the following additional steps:
cease the application of the repositioning transformation.

20. The method according to claim 16 comprising, before the step of registering the loaded preoperative imaging data into the intraoperative US imaging data, for a coarse pre-registering of the loaded preoperative imaging data with the EMT coordinate system, the following steps:
receiving from a user an input indicating a coarse pose of a patient in respect of the EMT tracker;
calculating a CT-EMT transformation matrix ($^{Tr}T_{CT}$) from the received coarse pose;
transforming the loaded preoperative imaging data with the CT-EMT transformation matrix ($^{Tr}T_{CT}$);

using the transformed preoperative imaging data as the loaded preoperative imaging data of the registering step.

21. The method according to claim 16 for providing visual representations of organ registration and tracking during a guided percutaneous procedure using an operating table (Ta) with an EMT sensor, the method comprising the steps of:

receiving a 3D pose of the operating table (Ta) tracked in real-time from the EMT system;

calculating a Ta-EMT transformation matrix ($^{Tr}T_{Ta}$) from the received pose of the operating table;

multiplying the EMT-catheter transformation matrix ($^{C}T_{Tr}$) by the Ta-EMT transformation matrix ($^{Tr}T_{Ta}$) for obtaining a Ta-catheter transformation matrix ($^{C}T_{Ta}$) which represents the pose of the operating table in respect of the catheter pose;

using Ta-catheter transformation matrix ($^{C}T_{Ta}$) to define an up-vector direction for aligning a 3D camera view of the visual representations.

22. The method according to claim 16 wherein the 3D poses tracked in real-time via the EMT system are tracked through point EMT sensors.

23. The method according to claim 16, wherein the point EMT sensors are placed on a tip of the catheter and on a tip of the needle.

24. The method according to claim 16, wherein the user interface is a 2D display, a 3D display, a virtual-reality display or an augmented-reality display.

25. The method according to claim 16, wherein the catheter is for positioning in a working channel in the organ by a flexible ureterorenoscope.

26. The method according to claim 16 wherein the preoperative imaging data comprises 3D organ model or models previously reconstructed from preoperative MRI or CT images.

27. The method according to claim 16 wherein the intraoperative imaging data comprises 3D organ model or models reconstructed from intraoperative US images.

28. The method according to claim 16 wherein the organ is a kidney and the guided percutaneous procedure is a percutaneous renal access.

29. The method according to claim 16 comprising repeatedly recalculating said matrices and regenerating said visual representations.

30. The method according to claim 16 comprising the following additional steps:

loading additional preoperative imaging data of a body region that is not subject to respiratory movement, represented in respect of predetermined coordinates of the previous preoperative images (CT);

multiplying the probe-EMT transformation matrix ($^{Tr}T_P$) by the probe calibration transformation matrix ($^{P}T_{US}$) for obtaining an intraoperative-EMT transformation matrix ($^{Tr}T_{US}$) which represents said coordinates of intraoperative imaging data in respect of the tracker pose;

transforming the loaded additional preoperative imaging data by the same registering ($T_{reg}$) of the preoperative imaging data into the intraoperative US imaging data;

transforming the registered additional preoperative imaging data with the obtained intraoperative-EMT transformation matrix ($^{Tr}T_{US}$);

generating a visual representation of the transformed registered additional preoperative imaging data for displaying on the user interface.

31. A non-transitory computer-readable medium comprising computer program instructions for implementing a guided percutaneous device for providing visual representations of organ registration and tracking during a guided percutaneous procedure using an electromagnetic tracking (EMT) system, which when executed by a processor, cause the processor to carry out the method of claim 16.

* * * * *

UNITED STATES PATENT AND TRADEMARK OFFICE
CERTIFICATE OF CORRECTION

PATENT NO. : 12,458,397 B2  
APPLICATION NO. : 18/288783  
DATED : November 4, 2025  
INVENTOR(S) : João Luís Gomes Da Fonseca et al.

Page 1 of 1

It is certified that error appears in the above-identified patent and that said Letters Patent is hereby corrected as shown below:

On the Title Page

Item (72) "Inventors", Column 1, Line 6, please delete "Oporto" and insert -- Porto --, therefore.

Item (72) "Inventors", Column 1, Line 7, please delete "Oporto" and insert -- Porto --, therefore.

Signed and Sealed this  
Ninth Day of December, 2025

John A. Squires  
*Director of the United States Patent and Trademark Office*